United States Patent [19]

Inoue et al.

[11] Patent Number: 4,689,363
[45] Date of Patent: Aug. 25, 1987

[54] OIL-RESISTANT ROOM TEMPERATURE-CURABLE SILICONE RUBBER COMPOSITION

[75] Inventors: Yoshio Inoue; Masatoshi Arai; Shinichi Sato, all of Gunma, Japan

[73] Assignee: Shin-Etsu Chemical Co., Ltd., Tokyo, Japan

[21] Appl. No.: 883,064

[22] Filed: Jul. 8, 1986

[30] Foreign Application Priority Data

Jul. 10, 1985 [JP] Japan ................................ 60-151880

[51] Int. Cl.$^4$ ................................................. C08K 5/04
[52] U.S. Cl. .................................... 524/394; 524/396; 524/397; 524/777
[58] Field of Search ................ 524/394, 396, 397, 777

[56] References Cited

U.S. PATENT DOCUMENTS 4,448,919  5/1984  Murase ............................... 524/396
4,528,313  7/1985  Swihart et al. ...................... 524/397
4,636,324  1/1987  Murase et al. ...................... 524/394

Primary Examiner—Melvyn I. Marquis
Attorney, Agent, or Firm—Jules E. Goldberg

[57] ABSTRACT

The room-temperature curable silicone rubber composition is formulated, in addition to the conventional ingredients of a hydroxy-terminated diorganopolysiloxane and an organosilicon compound having at least two hydrolyzable groups in a molecule, a substantial amount of an alkali metal salt of a weak acid having an acid dissociation constant as expressed by $pK_a$ in the range from 2.0 to 12.0 at 25° C. such as acrylic, methacrylic, benzoic and acetic acids. By virtue of this unique ingredient compounded therein, the composition of the invention can give a vulcanized rubber having outstandingly high resistance against oils used in automobiles even at elevated temperatures.

6 Claims, 1 Drawing Figure

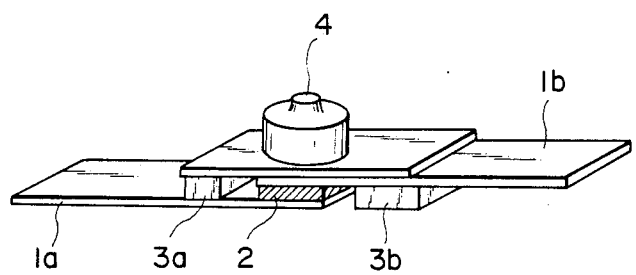

OIL-RESISTANT ROOM TEMPERATURE-CURABLE SILICONE RUBBER COMPOSITION

BACKGROUND OF THE INVENTION

The present invention relates to a room temperature-curable silicone rubber composition or, more particularly, to a room temperature-curable silicone rubber composition capable of giving a cured silicone rubber having extremely high resistance against oils.

Needless to say, various kinds of sealing materials such as gaskets and packings are used in and around automobile engines and these sealing materials are usually shaped of a highly oil-resistant material such as cork, organic rubbers, asbestos and the like in view of contacting of oils with the sealing material. These conventional sealing materials, however, are not quite advantageous in respect of management of stockpiles and process control, if not to mention the expensiveness, and are also not very reliable in their sealing performance.

In this regard, these conventional sealing materials are increasingly being replaced with FIPG (formed-in-place gasket) type sealing materials using various kinds of room temperature-curable rubber compositions including room temperature-curable or room temperature-vulcanizable silicone rubber compositions, referred to as RTV silicone rubber compositions hereinbelow, as the most useful ones which are highly evaluated in respect of the workability, sealing performance and heat resistance.

In compliance with the requirement in the modern automobile technology toward decrease of fuel consumption, it is a trend that the multi-grade gear oils of low viscosity used in automobile transmissions are admixed with an extreme pressure additive in a considerably large amount so that the sealing materials made of silicone rubbers are susceptible to the attack of such an oil containing a large amount of the extreme pressure additive at high temperatures leading to eventual leakage of oils after prolonged use of the sealing material.

Various proposals and attempts have been made in this regard of improving the oil resistance of silicone rubber-made sealing materials obtained from a RTV silicone rubber composition. For example, Japanese Patent Kokai 57-76055 teaches an improved formulation of RTV silicone rubber compositions in which finely divided magnesium oxide powder having a specific surface area of at least 50 m2/g is compounded in combination with a reinforcing silica filler. Further, Japanese Patent Kokai 59-80463 teaches a formulation in which zinc carbonate or zinc oxide is compounded with RTV silicone rubber compositions. The improvements so far proposed, however, are still insufficient to provide a complete solution of the problem in respect of the oil resistance of silicone rubbers since the automobile oils in recent years are admixed with a further and further increasing amount of an extreme pressure additive to comply with the requirement of upgrading of oils against which the FIPG sealing materials also should heve further increased resistance. Therefore, it is eagerly desired to develop a novel RTV silicone rubber composition capable of withstanding contacting with such a high-performance automobile oil at high temperatures with a long serviceable life

SUMMARY OF THE INVENTION

The present invention has an object to provide such an improved RTV silicone rubber composition to meet the severest requirement in the automobile technology in respect of the oil resistance, and the RTV silicone rubber composition provided by the invention comprises:

(a) 100 parts by weight of a diorganopolysiloxane having a linear molecular structure and terminated at both molecular chain ends each with a silanolic hydroxy group;

(b) from 1 to 25 parts by weight of an organosilicon compound having, in a molecule, at least two hydrolyzable group bonded to the silicon atom or atoms; and (c) from 0.1 to 50 parts by weight of an alkali metal salt of a weak acid of which the acid dissociation constant as expressed by $pK_a$ is in the range from 2.0 to 12.0 at 25° C.

BRIEF DESCRIPTION OF THE DRAWING

The FIGURE is a schematic illustration of a perspective view of the test panels under preparation of a test specimen for the test of the shearing adhesive bonding strength of the inventive composition.

DETAILED DESCRIPTION OF THE PREFERRED EMBODIMENTS

As is understood from the above given summarizing description, the most characteristic feature of the inventive RTV silicone rubber composition consists in the formulation of the unique component (c) by virtue of which the cured silicone rubber of the composition is imparted with greatly improved oil resistance even against an automobile oil containing a large amount of an extreme pressure additive.

The components (a) and (b) in the inventive RTV silicone rubber composition are rather conventional. Namely, the component (a) is a diorganopolysiloxane having a substantially linear molecular structure and terminated at both molecular chain ends each with a silanolic hydroxy group, i.e. a hydroxy group directly bonded to a silicon atom. Such a diorganopolysiloxane is represented by the general formula

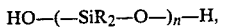

in which n is a positive integer of 5 or larger and the symbol R denotes a monovalent hydrocarbon group exemplified by alkyl groups, e.g. methyl, ethyl and propyl groups, alkenyl groups, e.g. vinyl and allyl groups, cycloalkyl groups, e.g. cyclohexyl group, and aryl groups, e.g. phenyl and tolyl groups, as well as those substituted groups obtained by replacing a part or all of the hydrogen atoms in the above named hydrocarbon groups with substituents such as halogen atoms. It is optional that two kinds or more of the hydrocarbon groups denoted by R are contained in a molecule of the diorganopolysiloxane. The value of the subscript n should be so large that the diorganopolysiloxane may have a viscosity in the range from 25 to 500,000 centistokes or, preferably, from 1000 to 100,000 centistokes at 25° C.

The component (b) is an organosilicon compound having at least two or, preferably, at least three hydrolyzable groups bonded to the silicon atom or atoms in a molecule. The organosilicon compound serves as a crosslinking agent of the component (a) and may be an organosilane compound having a single silicon atom or an organopolysiloxane compound having at least two silicon atoms in a molecule. When the organosilicon compound is admixed with the component (a) and the mixture is exposed to an atmosphere containing moisture, a condensation reaction readily takes place between the hydrolyzable group of this component and the terminal hydroxy group in the component (a) to form a crosslink. Various types of hydrolyzable groups can pertain to such a condensation reaction including alkoxy groups, e.g. methoxy, ethoxy, propoxy, isopropoxy and butoxy groups, organoketoxime groups, e.g. acetonoxime and butanonoxime groups, substituted amino groups, e.g. dimethyl amino, di-ehyl amino and cyclohexyl amino groups, N-substituted amido groups, e.g. N-methyl acetamido group, substituted aminoxy groups, e.g. dimethyl aminoxy and diethyl aminoxy groups, and alkenyloxy groups, e.g. propenyloxy group. It is optional that the organosilicon compound has two kinds or more of these hydrolyzable groups in a molecule.

Particular examples of the organosilicon compounds having at least two hydrolyzable groups include the organosilane compounds such as alkoxy silane compounds, e.g. methyl trimethoxy silane, vinyl trimethoxy silane, methyl triethoxy silane, vinyl triethoxy silane, ethyl orthosilicate and propyl orthosilicate, alkenyloxy silane compounds, e.g. methyl tripropenyloxy silane and vinyl tri(isopropenyloxy) silane, oxime silane compounds, e.g. methyl tris(acetonoxime) silane and methyl tris(butanonoxime) silane, amino-containing silane compounds, e.g. methyl tris(dimethylamino) silane and methyl tris(diethylamino) silane, amido-containing silane compounds, e.g. methyl tris(N-methyl acetamido) silane and vinyl tris(N-ethyl acetamido) silane, aminoxy-containing silane compounds, e.g. methyl tris(dimethylaminoxy) silane and methyl tris(diethylaminoxy) silane, and the like and the organopolysiloxane compounds of a relatively low molecular weight having a linearly chain-like, branched chain-like or ring-wise molecular structure as obtained by the partial hydrolysis-condensation reaction of the above named hydrolyzable organosilane compound, optionally, with introduction of other siloxane units.

The amount of the hydrolyzable organosilicon compound as the component (b) in the inventive composition should be in the range from 0.5 to 30 parts by weight per 100 parts by weight of the component (a). When the amount of the component (b) is too small, the RTV silicone rubber composition can be cured only insufficiently as a matter of course due to the scarcity of the crosslinking density. When the amount of the component (b) is too large, on the other hand, the cured silicone rubber of the composition may be somewhat brittle and unduly hard due to the excessively high crosslinking density in addition to the undesirable effect that the curing velocity of the composition is more or less decreased.

The component (c) in the inventive composition, which is an alkali metal salt of a weak acid, serves as an oil-resistance improver in the cured silicone rubber of the composition. The unexpectedly exhibited effect of oil-resistance improvement may be a result of the following mechanism. When a gear oil admixed with an extreme pressure additive is used for lubrication of steel-made gears, for example, the acidic matter produced as a decomposition product of the extreme pressure additive provides a coating on the surface of the gears to prevent seizure of gears by failure of lubrication while such an acidic matter is also detrimental to cause degradation of silicone rubbers. When the silicone rubber contains the above mentioned alkali metal salt of a weak acid, the salt acts as a neutralizing agent of the acidic matter so that the silicone rubber is imparted with improved oil resistance even against a gear oil containing a large amount of an extreme pressure additive. According to the result of the investigations to establish the types and amount of the salt having the highest efficiency of the above mentioned oil-resistance improving effect, the salt should be an alkali metal salt of an acid having an acid dissociation constant in the range from 2.0 to 12.0 or, preferably, from 4.0 to 9.0 at 25° C. as expressed by the $pK_a$ since the desired effect is greatly reduced when the acid dissociation constant of the acid is outside this range. The alkali metal may be sodium or potassium though not limited thereto. The weak acid which satisfies the above mentioned requirement for the acid dissociation constant is exemplified by carboxylic acids such as acetic acid, propionic acid, acrylic acid, methacrylic acid, sorbic acid, phthalimide and benzoic acid having the $pK_a$ values of 4.7, 4.9, 4.3, 4.3, 4.3, 8.3 and 4.2, respectively, at 25° C. and inorganic acids such as carbonic acid and phosphoric acid having the $pK_a$ values of 6.4 and 2.1, respectively, at 25° C.

The amount of the salt as the component (c) in the invertive composition should be in the range from 0.1 to 50 parts by weight or, preferably, from 0.5 to 10 parts by weight per 100 parts by weight of the component (a). When the amount thereof is too small, the desired improvement of oil resistance of the cured silicone rubber cannot be achieved as a matter of course. When the amount thereof is too large, on the other hand, the cured silicone rubber of the composition may have poor physical properties as a rubbery elastomer.

The RTV silicone rubber composition of the present invention can be prepared by uniformly blending the above described components (a), (b) and (c) in a suitable blending machine under an anhydrous atmosphere. When a long pot life of the composition is desired, the preparation may be in two packages one containing a uniform mixture of the components (a) and (c) and the other containing the component (b) and the contents of the two packages are blended together directly before use. The inventive RTV silicone rubber composition composed of the above described components (a), (b) and (c) alone is fully curable when it is exposed to an atmosphere containing moisture so as to cause the condensation reaction between the terminal hydroxy groups in the component (a) and the hydrolyzable groups in the component (b). It is of course optional that the composition is further admixed with a known catalytic compourd capable of promoting the above mentioned condensation reaction such as amine compounds, quaternary ammonium salts, organometallic compounds, chelate compounds of titanium, guanidino group-containing compounds and others.

It is further optional that the inventive RTV silicone rubber composition is admixed with a variety of known additives conventionally used in the formulation of silicone rubbers including inorganic fillers for modifying the physical properties of the cured silicone rubber such as fumed and precipitated silica fillers, optionally, surface-treated with a hydrophobic agent, magnesium oxide, zinc carbonate, zinc hydroxycarbonate, zinc oxide, carbon black, titanium dioxide, iron (III) oxide, aluminum oxide, calcium carbonate, finely pulverized quartz, diatomaceous earth, calcium silicate, talc, bentonite and fibrous fillers, e.g. asbestos, glass fibers, organic fibers and the like. Other additives may be added according to need including coloring agents, heat or cold-resistance improvers, thixotropy-modifiers, dehydrating agents, adhesion aids and so on each in a limited amount.

As is understood from the above given detailed description, the inventive composition comprises, as the characteristic ingredient, the alkali metal salt of a weak acid as the essential component other than conventional ingredients and the procedure for the preparation thereof is also conventional. Since the alkali metal salts of many weak acids are readily available with low costs so that the inventive RTV silicone rubber composition is very advantageous in respect of the greatly improved oil resistance of the cured silicone rubber of the composition. Accordingly, the inventive RTV silicone rubber composition is useful as a FIPG type sealing material in and around engines of not only automobiles but also any other machines such as power cultivators and construction machines as well as around the differential gears. The inventive RTV silicone rubber composition is of course usable in any other applications in which oil resistance is required for the sealing material as in the machines used in building works, electric and electronic industries and so on.

In the following, examples are given to illustrate the inventive RTV silicone rubber compositions in more detail. In the following description, the expression of "parts" always refers to "parts by weight" the values of viscosity are all those obtained by the measurement at 25° C. Example 1

A base compound, which is referred to as the composition I hereinbelow, was prepared by uniformly blending, under an anhydrous condition, 100 parts of a dimethylpolysiloxane having a viscosity of 5200 centistokes and terminated at both molecular chain ends each with a silanolic hydroxy group, 8 parts of methyl tris(methyl ethyl ketoxime) silane, 17 parts of a magnesium oxide powder having an average particle diameter of 30μm, 15 parts of a fumed silica filler and 0.2 part of dibutyltin dioctoate.

The composition I prepared in the above given formulation was further admixed with 2.5 parts of one of the potassium (K) and sodium (Na) salts of a weak acid indicated in Table 1 below to give the compositions II to VIII.

Each of the compositions I to VIII was shaped into a sheet of 2 mm thickness which was kept standing for 7 days in an atmosphere of 55 % relative humidity at 23° C. to be converted into a sheet of cured silicone rubber. The cured silicone rubber sheets were each dipped in a gear oil for automobile (Castle Gear Oil 80W-90, a product by Toyota Motors Co.) kept at 120° C. for 10 days and then subjected to the measurement of the mechanical properties, i.e. hardness, tensile strength and ultimate elongation, according to the procedure specified in JIS K 6301 to give the results shown in Table 1 below together with the values before dipping in oil.

EXAMPLE 2

A base compound, which is referred to as the composition IX hereinbelow, was prepared by uniformly blending, under an anhydrous condition, 100 parts of a dimethylpolysiloxane having a viscosity of 19,600 centistokes and terminated at both molecular chain ends each with a silanolic hydroxy group, 6 parts of vinyl tris(isopropenyloxy) silane, 90 parts of a zinc carbonate powder having an average particle diameter of 30μm, 7.5 parts of carbon black and 0.5 part of 3-(1,1,3,3-tetrapropyl 2-guanidino)propyl trimethoxy silane of the formula $(Me_2NC)_2C=C(CH_2)_3Si(OMe)_3$, in which Me is a methyl group. The thus prepared base compound was further admixed with 1.0, 2.5 or 5.0 parts of potassium methacrylate to give three compounds, pounds which are referred to as the compositions X, XI and XII, respectively, hereinbelow.

Each of the compositions IX to XII was shaped and cured and subjected to the measurements of the mechanical properties either before or after dipping in the gear oil in the same manner as in Example 1 to give the results shown in Table 2 below.

TABLE 1

| Composition No. | Salt | Before dipping in oil | | | After dipping in oil | | |
|---|---|---|---|---|---|---|---|
| | | Hardness, JIS | Tensile strength, kg/cm² | Ultimate elongation, % | Hardness, JIS | Tensile strength, kg/cm² | Ultimate elongation, % |
| I | None | 54 | 31 | 200 | (not measurable) | | |
| II | K acrylate | 51 | 34 | 250 | 26 | 11 | 240 |
| III | K phthalimide | 52 | 33 | 250 | 3 | 3 | 160 |
| IV | K sorbate | 56 | 29 | 220 | 18 | 5 | 220 |
| V | K benzoate | 54 | 32 | 220 | 4 | 5 | 150 |
| VI | K methacrylate | 52 | 36 | 280 | 33 | 11 | 225 |
| VII | Na acetate | 46 | 30 | 300 | 5 | 6 | 320 |
| VIII | K carbonate | 54 | 29 | 240 | 31 | 12 | 270 |

TABLE 2

| Composition No. | Amount of salt, parts | Before dipping in oil | | | After dipping in oil | | |
|---|---|---|---|---|---|---|---|
| | | Hardness, JIS | Tensile strength, kg/cm$^2$ | Ultimate elongation, % | Hardness, JIS | Tensile strength, kg/cm$^2$ | Ultimate elongation, % |
| IX | 0 | 55 | 31 | 280 | (not measurable) | | |
| X | 1.0 | 55 | 32 | 290 | 20 | 10 | 310 |
| XI | 2.5 | 54 | 32 | 290 | 28 | 18 | 280 |
| XII | 5.0 | 53 | 30 | 260 | 31 | 20 | 260 |

EXAMPLE 3

A base compound, which is referred to as the composition XIII hereinbelow, was prepared by uniformly blending, under an anhydrous condition 100 parts of a dimethylpolysiloxane having a viscosity of 5,100 centistokes and terminated at both molecular chain ends each with a silanolic hydroxy group, 6 parts of vinyl tri(methyl ethyl ketoxime) silane, 90 parts of a zinc hydroxycarbonate powder having an average particle diameter of 20 μm, 10 parts of a fumed silica filler, 1.0 part of 3-aminopropyl trimethoxy silane, 0.2 part of dibutyltin dioctoate and 2.5 parts of potassium methacrylate.

This composition XIII was shaped and cured into a silicone rubber sheet in the same manner as in Example 1 and pieces of the cured rubber sheet were each dipped in the same gear oil as used in the preceding examples or in a gear oil of another grade (Castle MG Gear Oil Special 75W-90, a product by Toyota Motors Co.) containing a smaller amount of the extreme pressure additive than in the former gear oil for 10 days and 20 days. Table 3 below shows the mechanical properties of the rubber sheets either before or after dipping in oils for two different lengths of time. This table shows also the values of the shearing adhesive bonding strength determined in the procedure described below with reference to the figure of the accompanying drawing.

A cold-rolled steel plate 1a according to JIS G 3141 having dimensions of 100 mm length by 25 mm width by 1 mm thickness and ground on the surface with a sand paper was coated on the end portion of 25 mm wide and 10 mm long area with the sealing agent, i.e. the composition XIII, to form a coating layer 2. On both sides of this coated area, two Teflon plates having a thickness of 2 mm were placed as the spacers 3a, 3b and further another steel plate 1b was put thereon as illustrated in the FIGURE and loaded with a 500 g weight 4 put thereon. The steel plates 1a, 1b were firmly bonded together after standing as such for 96 hours at 23° C. in an atmosphere of 55% relative humidity. The shearing adhesive bonding strength was measured of this test specimen either before or after dipping in the oils as mentioned above.

TABLE 3

| | Hardness, JIS | Tensile strength, kg/cm$^2$ | Ultimate elongation, % | Shearing adhesion, kg/cm$^2$ |
|---|---|---|---|---|
| As cured | 60 | 36 | 210 | 8 |
| After 10 days in 75W-90 oil at 120° C. | 45 | 20 | 180 | 14 |
| After 20 days in 75W-90 oil at 120° C. | 39 | 12 | 160 | 8 |
| After 10 days in 80W-90 oil at 120° C. | 35 | 12 | 140 | 17 |
| After 20 days in 80W-90 oil at 120° C. | 25 | 8 | 100 | 10 |

What is claimed is:

1. A room temperature vulcanizable silicone rubber composition which comprises:
   (a) 100 parts by weight of a diorganopolysiloxane having a linear molecular structure and terminated at both molecular chain ends each with a silanolic hydroxy group;
   (b) from 1 to 25 parts by weight of an organosilioon compound having, in a molecule, at least two hydrolyzable group bonded to the silicon atom or atoms; and
   (c) from 0.1 to 50 parts by weight of an alkali metal salt of a weak acid of which the acid dissociation constant as expressed by pK$_a$ is in the range from 2.0 to 12.0 at 25° C.

2. The room temperature vulcanizable silicone rubber composition as claimed in claim 1 wherein the diorganopolysiloxane is a dimethylpolysiloxane.

3. The room temperature vulcanizable silicone rubber composition as claimed in claim 1 wherein the diorganopolysiloxane has a viscosity in the range from 25 to 500,000 centistokes at 25° C.

4. The room temperature vulcanizable silicone rubber composition as claimed in claim 1 wherein the weak acid is selected from the class consisting of acetic acid, propionic acid, arcrylic acid, methacrylic acid, benzoic acid, carbonic acid and phosphoric acid.

5. The room temperature vulcanizable silicone rubber composition as claimed in claim 1 wherein the alkali metal is sodium or potassium.

6. The room temperature vulcanizable silicone rubber composition as claimed in claim 1 wherein the amount of the alkali metal salt is in the range from 0.5 to 10 parts by weight per 100 parts by weight of the component (a).

* * * * *